United States Patent Office 3,007,577
Patented Nov. 7, 1961

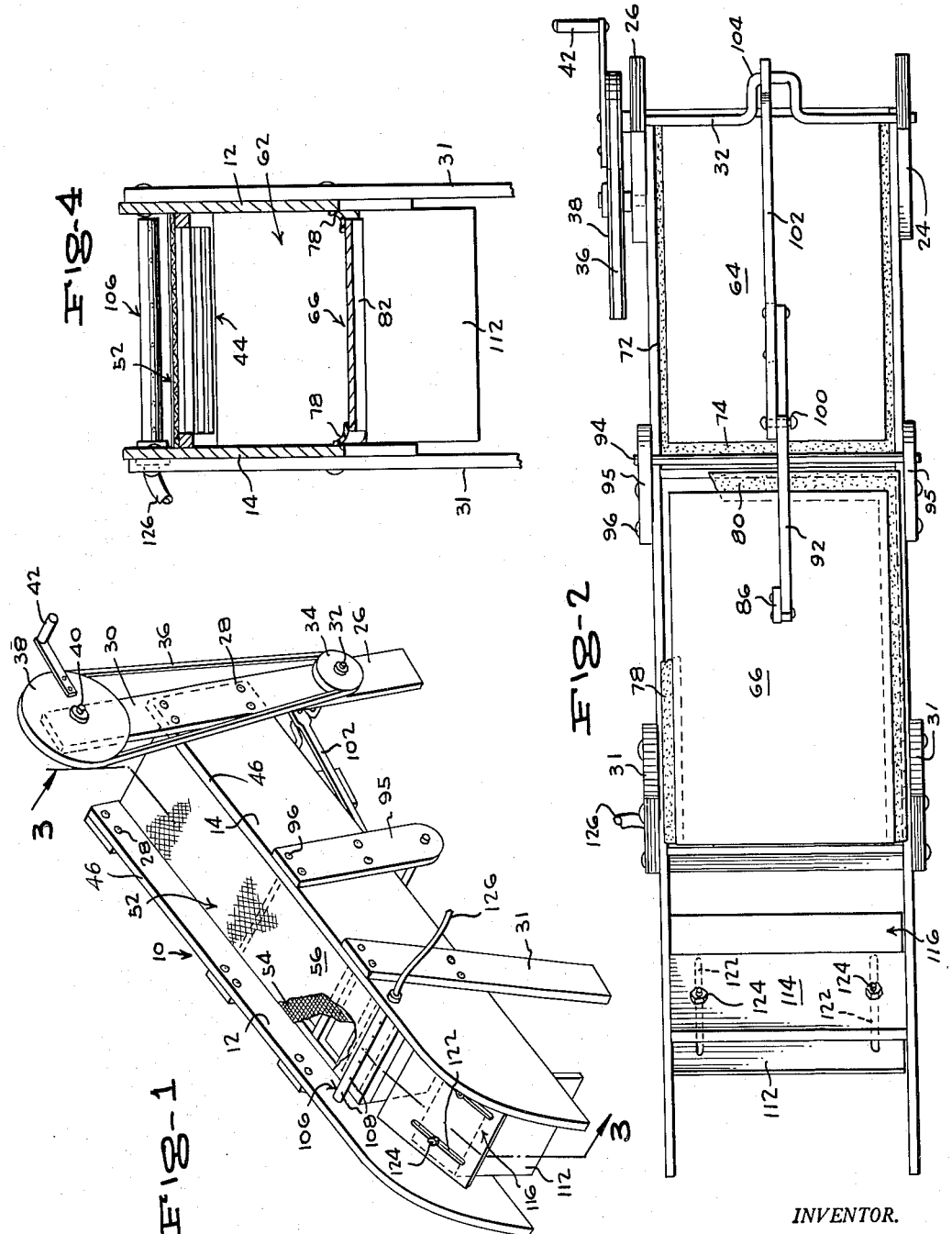

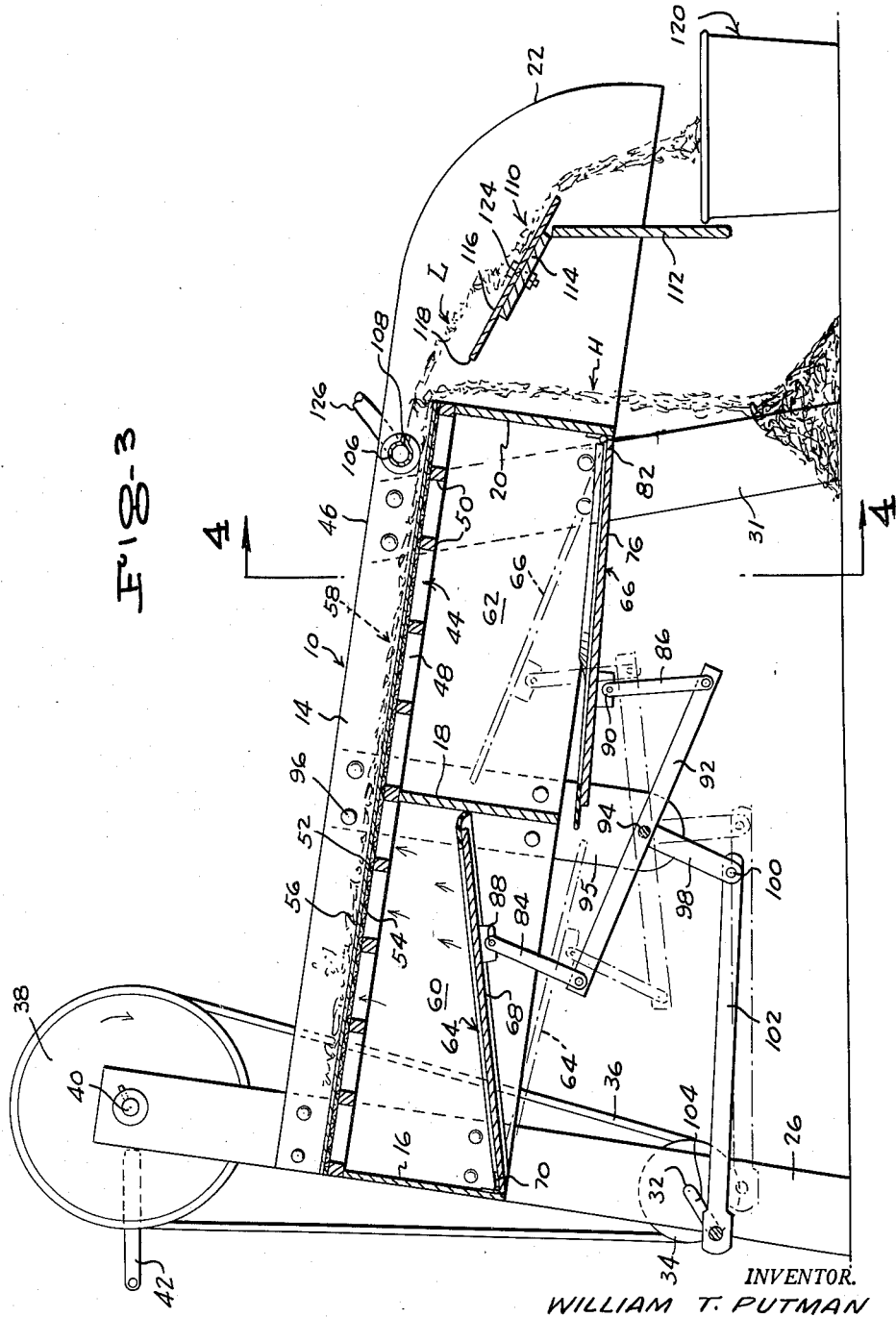

3,007,577
CONCENTRATOR
William T. Putman, 10015 E. Empire, Spokane 6, Wash.
Filed Sept. 19, 1958, Ser. No. 762,102
3 Claims. (Cl. 209—475)

This invention relates to improvements in pneumatic separating apparatus, and more particularly to an improved pneumatic concentrator for dry granular or comminuted material, such as ores.

The primary object of the invention is to provide more efficient and practical apparatus of the character indicated which, while not confined to such, is especially suitable for manual operation for field use and for small-scale operations, and which eliminates the need for washing or flotation water in localities where water is scarce or unavailable.

Another important object of the invention is to provide inexpensive apparatus of the character indicated above which is simple and rugged in construction, composed of a relatively small number of simple and easily assembled parts, and which can be made in compact and lightweight forms so as to be readily portable from location to location in the field.

Other important objects and advantageous features of the invention will be apparent from the following description and the accompanying drawings, wherein, for purposes of illustration only, a specific form of the invention is set forth in detail.

In the drawings:

FIGURE 1 is a perspective view of a concentrator of the invention;

FIGURE 2 is an enlarged bottom plan view of FIGURE 1;

FIGURE 3 is an enlarged vertical longitudinal section taken on the line 3—3 of FIGURE 1; and FIGURE 4 is a transverse vertical section taken on the line 4—4 of FIGURE 3.

Referring in detail to the drawings, wherein like numerals designate like parts throughout the several views, the illustrated concentrator apparatus comprises an elongated and forwardly declining chute 10 having side walls 12 and 14 which are parallel spaced and connected together by an upper or rear vertical wall 16, an intermediate vertical wall 18, and a lower or forward vertical wall 20. The rear wall 16, as shown in FIGURE 3, is at the upper or rear end of the chute 10, the forward wall 20 is spaced rearwardly from the forward ends 22 of the chute side walls, and the intermediate wall 18 is equally spaced between and from the rear and front walls.

The chute 10 is ground-supported at a sufficient forwardly declining angle, by means of rear legs 24 and 26 which are suitably secured, as indicated at 28, to the outer sides of the chute side walls 12 and 14, at the rear end of the chute 10. The rear legs are preferably slightly forwardly tilted, as shown, and the rear leg 14 has on its upper end a vertical extension 30. Forward legs 31 are secured to the outer sides of the side walls 12 and 14. A transverse crank shaft 32 extends between and is journaled through the rear legs 24 and 26 on a level near the lower ends thereof, which has fixed thereon a pulley 34 positioned at the outer side of the rear leg 26. An endless belt 36 is trained around the shaft pulley 34 and over a larger belt pulley 38 which is fixed on a shaft 40 journaled on the vertical extension 30 near the upper end thereof, and a hand crank 42 is provided on the shaft 40, for manual operation of the concentrator. It is obvious that motor operation of the concentrator through a suitable drive connection to the crank shaft 32 is optional.

The chute 10 further comprises a forwardly declining open-work frame 44 which extends between the side walls 12 and 14 from the rear wall 16 to the forward wall 20, and which overlies and rests upon the upper edges of the walls 16, 18 and 20, and is suitably secured in place on a level below the upper edges 46 of the side walls 12 and 14. The frame 44 comprises side bars 48 and transverse cross bars 50 which are spaced from each other at regular and substantial distances.

Suitably secured in place and lying upon the upper side of the frame 44 and extending the full width and length thereof is a screen assembly 52, which includes a wire mesh lower sheet or plate 54, and an upper relatively fine mesh fabric sheet 56, both of which are air-permeable. The assembly 52 constitutes the effective forwardly declining bottom of the chute 10, upon which granular or comminuted material 58 is placed and moved forwardly and downwardly in the concentration process.

The screen assembly 52, the chute side walls 12 and 14 and the rear wall 16, the forward wall 20, and the intermediate wall 18, define rear and forward open-bottom air chambers 60 and 62, respectively, in which are pumping vanes or pistons 64 and 66, respectively, operate. The rear pumping vane or piston 64 is in the form of a flat plate 68 of the same shape but slightly narrower and shorter than the rear air chamber 60, which is hinged at its rear end, as indicated at 70 at the lower end of the rear chute wall 16, and has flexible and resilient air-sealing strips 72 and 74, fixed along and reaching beyond the side and forward edges, and in wiping contact with the chute side walls 12 and 14 and the intermediate wall 18. A similar flat plate 76 constitutes the forward piston 66, which has similar strips 78 and 80, secured along and reaching beyond its side edges and its free rear edge, so as to sealingly contact the intermediate chute wall 18 and the chute side walls. The piston plate 76 is hinged, as indicated at 82 at its forward end to the lower end of the chute front wall 20.

Vertical depending links 84 and 86 are pivoted at their upper ends, as indicated at 88 and 90, respectively to the undersides of the plates 68 and 76, near their free edges and are pivoted at their lower ends to related ends of a generally horizontal walking beam 92 which is fixed to the center of a transverse rock shaft 94 which is journaled at its ends in brackets 95, secured, as indicated at 96, to the outer sides of the chute side walls 12 and 14, at the locations of the intermediate chute wall 18, and depending below the chute 10. The walking beam 92 has a depending lever arm 98 to whose lower end is pivoted, as indicated at 100, the forward end of a generally horizontal pitman 102, whose rear end is journaled on a throw 104 on the crank shaft 32, which is rotated by turning the hand crank 42.

When the hand crank 42 is turned, the air vanes 64 and 66 are alternately swung upwardly and downwardly in the air chamber 60 and 62, respectively, as indicated in full and in phantom lines in FIGURE 3, so that air is alternately forced under pressure upwardly through the portions of the screen assembly 52 overlying the respective chambers 60 and 62, and through the granular material, lying thereupon, so that low specific gravity components of the material are forced upwardly through the mass of material, and heavier components remain more or less undisturbed at the bottom of the mass and come to rest upon the screen assembly, while the lighter components deposit as a separate layer superimposed upon the heavier components, this being an effective separation of the two components.

It is to be noted that the broad cross section and homogeneous columns of air compressed by the vanes 64 and 66 in the chambers 60 and 62 and forced therein upwardly through the screen assembly 52, and thereby through the material 58 resting upon the screen assembly 52, is more efficient and effective in the pneumatic and gravitational separation of components of different specific gravities than air jets, which have the tendency to over-penetrate certain areas of the material to be concentrated while under-penetrating other areas thereof.

Further, the even distributions of broad and homogeneous upward air pressure produced by the vanes 64 and 66 and air chambers 60 and 62, enables obtaining the desired separations of components at lower air pressures and with the use of less operating power or work on the part of the operator of the apparatus.

In addition, an important advantage obtained by the above described use of air pressure in that the material resting upon the screen assembly 52 is lightly lifted, with equal force throughout the width and length thereof, from the screen assembly 52, to a sufficient extent to overcome the friction between the material 58 and the screen assembly 52, so that the material, including the separated components is enabled to freely slide gravitationally down along the screen assembly 52 to fall off the lower end thereof, onto the ground or into a suitable receptacle (not shown).

For sweeping off the upper layer of light-weight components from the lower layer of heavy components, as the separated components approach the lower end of the screen assembly 52, a transverse blower tube 106 is mounted through the chute side walls 12 and 14 on a level spaced above the screen assembly 52 and the material 58 thereon, at a point near to and spaced rearwardly from the forward end of the screen assembly, as shown in FIGURES 1 and 3, and is provided in its forward side with a longitudinal row of air nozzles 108 which direct compressed air at a forward and downward angle to the upper layer of lightweight components and drive the same forwardly, as indicated at L, while the heavier components fall off the end of the screen assembly 52, as indicated at H.

For preventing the forwardly blown lightweight separated out component L from remixing with the falling heavier components H, an adjustable separator assembly 110 is provided, which comprises a depending vertical plate 112 secured between the chute side walls 12 and 14 at a point spaced forwardly from and spaced below the forward end of the chute assembly 52, and a rearwardly inclined plate 114 extending rearwardly at the upper end of the plate 112. Mounted upon and extending rearwardly from the plate 114 is an adjustable gap plate 116, having a rear edge 118, which is selectively spaced from and on a level slightly below the forward end of the screen assembly 52, in order to provide therebetween a gap, sufficient in width to enable free falling of the heavy component H off the forward end of the assembly 52, but sufficiently narrow to assure that the lightweight components L pass across the gap and land upon the gap plate 116 or therebeyond, whence the light weight component L can fall into a collection receptacle 120. For adjustability the gap plate 116 has spaced longitudinal slots 122 in which are engaged clamping bolts 124 secured in the inclined plate 114. A hose 126, leading from a suitable source of air under pressure (not shown) is connected to one end of the blower tube 106.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A pneumatic concentrator comprising a chute, a forwardly declining air-permeable bottom wall extending along said chute, said bottom wall having an elevated rear end and a depressed forward end, air chambers beneath said bottom wall comprising a rear chamber and a forward chamber, a transverse vertical wall separating said chambers, said chambers having side walls provided with air inlet openings adjacent to the lower ends of the chamber side walls, said chambers having end walls spaced from said partition wall, air compressing vanes extending across the interior of said chambers and reaching to the end walls from the partition wall and between the side walls, said vanes being imperforate, said vanes being pivoted at related ends to related ones of said end walls, said vanes being adapted to occupy depressed positions wherein the vanes are positioned below said air inlet openings, and mechanism for alternately swinging the vanes upwardly in the chambers to elevated positions and return.

2. A pneumatic concentrator comprising a chute, a forwardly declining air-permeable bottom wall extending along said chute, said bottom wall having an elevated rear end and a depressed forward end, air chambers beneath said bottom wall comprising a rear chamber and a forward chamber, a transverse vertical wall separating said chambers, said chambers having side walls provided with air inlet openings adjacent to the lower ends of the chamber side walls, said chambers having end walls spaced from said partition wall, air compressing vanes extending across the interior of said chambers and reaching to the end walls from the partition wall and between the side walls, said vanes being imperforate, said vanes being pivoted at related ends to related ones of said end walls, said vanes being adapted to occupy depressed positions wherein the vanes are positioned below said air inlet openings, and mechanism for alternately swinging the vanes upwardly in the chambers to elevated positions and return, a forwardly declining gap plate supported on a level below the depressed forward end of the chute bottom wall and spaced forwardly from said depressed end, and an air jet pipe extending across the chute and spaced upwardly from the bottom wall at a location near said depressed end, said jet tube having opening means facing said gap plate.

3. A pneumatic concentrator comprising a chute, a forwardly declining air-permeable bottom wall extending along said chute, said bottom wall having an elevated rear end and a depressed forward end, air chambers beneath said bottom wall comprising a rear chamber and a forward chamber, a transverse vertical wall separating said chambers, said chambers having side walls provided with air inlet openings adjacent to the lower ends of the chamber side walls, said chambers having end walls spaced from said partition wall, air compressing vanes extending across the interior of said chambers and reaching to the end walls from the partition wall and between the side walls, said vanes being imperforate, said vanes being pivoted at related ends to related ones of said end walls, said vanes being adapted to occupy depressed positions wherein the vanes are positioned below said air inlet openings, and mechanism for alternately swinging the vanes upwardly in the chambers to elevated positions and return, said mechanism comprising an upper pulley mounted on the rear end of the chute, a lower pulley mounted on the chute below the chute bottom wall, an endless belt trained around the pulleys, a crank shaft journalled on the chute and carrying said lower pulley, said crank shaft having a throw, a pitman connected at its rear end to said throw, a walking beam pivoted intermediate its ends on the chute beneath and in line with said partition wall, said pitman having an eccentric connection to the walking beam, and links extending between and pivoted to related ends of the walking beam and severally pivoted to the vanes.

References Cited in the file of this patent

UNITED STATES PATENTS

| | | |
|---|---|---|
| 76,331 | Krom | Apr. 7, 1868 |
| 1,006,921 | Downey | Oct. 24, 1911 |
| 1,634,898 | Delamater | July 5, 1927 |
| 1,648,716 | Berrisford | Nov. 8, 1927 |
| 2,022,585 | Chance | Nov. 26, 1935 |
| 2,283,051 | Fuller | May 12, 1942 |
| 2,635,753 | McLean | Apr. 21, 1953 |
| 2,828,016 | Osborne | Mar. 25, 1958 |